W. F. CORNELIUS.

Assignor, by mesne assignments, to T. A. NEELY.

ROLLER SKATE.

No. 9,865. Reissued Sept. 6, 1881.

WITNESSES:
Geo. H. Remett,
Converse D. Marsh.

INVENTOR:
Wilber F. Cornelius
Per E. G. Prink
his Attorney

N. PETERS, Photo-Lithographer, Washington, D. C.

UNITED STATES PATENT OFFICE.

WILBER F. CORNELIUS, OF MUNCIE, INDIANA, ASSIGNOR, BY MESNE ASSIGNMENTS, TO THADDEUS A. NEELY.

ROLLER-SKATE.

SPECIFICATION forming part of Reissued Letters Patent No. 9,865, dated September 6, 1881.

Original No. 213,546, dated March 25, 1879. Application for reissue filed April 14, 1881.

*To all whom it may concern:*

Be it known that I, WILBER F. CORNELIUS, of Muncie, in the county of Delaware and State of Indiana, have invented certain new and useful Improvements in Roller-Skates, of which the following is a specification.

My invention relates to improvements in roller-skates in which the foot-rest is made adjustable in length, to form several sizes of skates, and the roller-hangers are provided with inclined pivot-bearings in their centers, one end of each bearing being higher than the other end, each inclined bearing operating in conjunction with beveled or angular pivot-bearing plates attached to the foot-rest; and the objects of my invention are, first, to afford facilities for the proper adjustment of the length of the foot-rest, whereby several different sizes may be obtained; second, to provide the roller-hangers with inclined central pivot-bearings, which operate in connection with corresponding inclined pivot-bearings in plates on the bottom of the foot-rest, by means of which the roller-hangers are forced to swing partially around horizontally on their respective inclined pivot-bearings by the lateral tilting or inclination of the foot-rest, thus causing the rollers to assume various angular positions, either to the right or left from that of a straight line, and run in curves relative to the amount of lateral inclination given to the foot-rest. I attain these objects by the mechanism illustrated in the accompanying drawings, in which—

Figure 1:
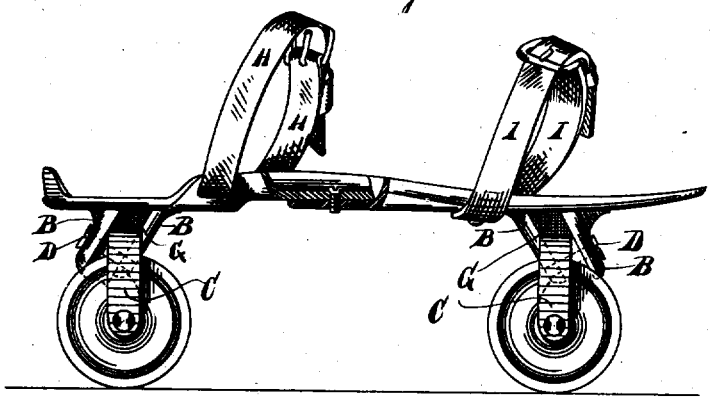
Figure 2:
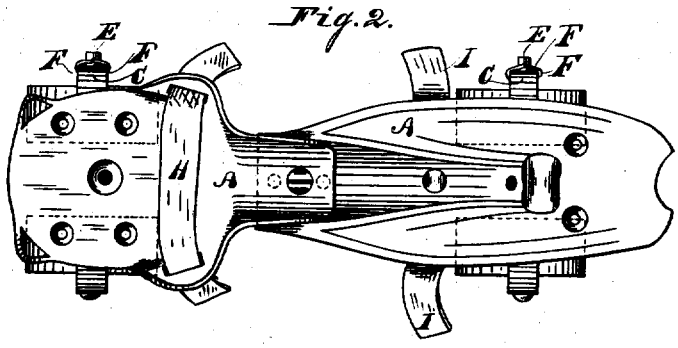
Figure 3:
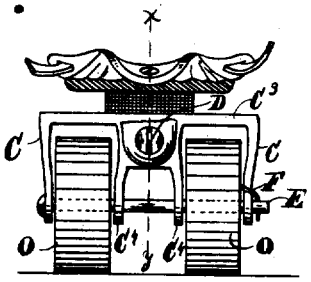
Figure 4:
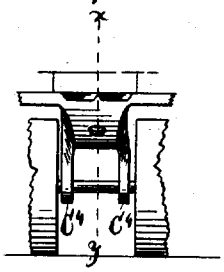
Figure 5:
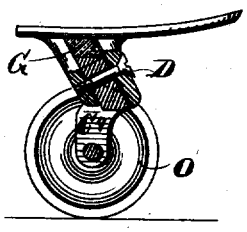

Figure 1 is a side elevation, with a section cut away to show the mode of adjusting the two parts of the foot-rest to various lengths. Fig. 2 is a plan view. Fig. 3 is an end view, partially in section, showing the spring. Fig. 4 is a detail view; and Fig. 5 is a vertical section, taken at the line *x y* of Fig. 3.

Like letters refer to like parts throughout the several views.

A is the adjustable extension foot-rest, constructed in two parts. The heel-piece of the foot-rest is made to slide over the rear part of the front piece, and said rear end of the front piece has several holes about one-half of an inch apart, by means of which and a screw or bolt the two pieces of the foot-rest may be screwed or bolted securely together and the length of the foot-rest a ljusted to three or four sizes.

B B represent two inclined plates, having an inclined slot between them, and each plate is provided with an inclined pivot-bearing—that is, the inclined pivot-bearing is at right angles to their inclined faces, or to the slot between them. Thus the bearing is closer to the bottom of the foot-rest in one plate than in the other, but in line with the direction of the length of the foot-rest. Two sets of these plates, with inclined pivot bearings in them, are employed on the foot-rest, one set at the front, and the other set at the rear, the angle of the inclined pivot-bearings in the rear set being reversed from that of the front set.

The hanger-bars $C^3$ $C^3$ are each provided at each end with forks C $C^4$, in which the rollers O O are mounted on their respective axles. The central portion of the hanger-bar $C^3$ is also provided with an inclined pivot-bearing corresponding in inclination to that of the inclined bearings in the plates B B, and is pivoted between said plates by a pivot or bolt, D, by means of which the hangers receive a horizontal swinging motion on the pivots D as the foot-rest is inclined to one side, and a reverse horizontal swinging motion as the foot-rest is inclined in the opposite direction, thus causing the front and rear wheels to assume reverse angles to a direct straight line of motion, and cause the skate to run in a curved line, the hind wheels tracking with the front wheels under all circumstances, the amount of curve given to the line of motion depending upon the vertical inclination of the pivot-bearing D and the amount of lateral inclination given to the foot-rest, thus giving the skater all the motions necessary in scientific skating. The forks C $C^4$ of the hangers are gouged out or made wider apart where they unite with the bar $C^3$ than where the pivot-stud or axle of the wheels is located, as shown in Fig. 3, for the purpose of preventing the wheels from coming in contact therewith.

E is the axle on which the wheels revolve, which is provided with a head at one end, and a small hole in the other end for a pin to be inserted for securing it in its proper place.

F is a wire bent around one arm, C, of the hanger, with its two ends pointing down. This wire slides up and down on the arm C of the hanger, and the two downwardly-pointed ends are inserted in the hole formed in the axle E. The points are then bent outward and hold the axle firmly in place, thus making a slide-fastening which is both durable and cheap.

In the space between the inclined or beveled plates B B, and between the upper surface of the hanger-bars $C^3$ and bottom of the foot-rest, is secured a rubber spring or cushion, by means of which the foot-rest and hangers are always held in position parallel with each other, except when the foot-rest is inclined laterally to either side. By extending the rubber springs G G farther out toward each end of the hanger-bars $C^3$, and giving a corresponding length of bearing on the bottom of the foot-rest, a greater resistance to the lateral motion of the foot-rest is afforded, and consequently less swinging motion of the hangers on their inclined pivots D is produced, thus permitting the skate to roll more in a straight line, making what is known as a "plain skate."

H I are the heel and toe straps, by means of which the skate is held firmly to the foot. The heel-strap H is held to the foot-rest by passing on the outside of a lug, then over the heel of the foot-rest, and through a corresponding lug on the opposite side, making a strong and secure fastening. The toe-strap I is fastened by means of a rivet directly back of the front hanger, both as shown in Fig. 2.

What I claim as new, and desire to secure by Letters Patent, is—

1. In a roller-skate, the extension foot-rest A, consisting of two cast metal plates adjustably secured together and having the hanger-plate B cast thereon or therewith, substantially as and for the purpose set forth.

2. The extension foot-rest A, provided with screw-fastenings in the center of foot-rest and lugs on the heel part of the foot-rest for securing the strap H and bevel-plates B B, for the purpose set forth.

3. The slide-fastenings F, constructed as described, in combination with hanger C and axle E, as set forth.

4. In a roller-skate, the extension foot-rest A, consisting of two cast metal plates adjustably secured together and having the hanger-plates B cast thereon or therewith, in combination with screw D and hanger C, as and for the purpose set forth.

In testimony whereof I have signed my name to this specification in the presence of two subscribing witnesses.

WILBER F. CORNELIUS.

Witnesses:
HENRY C. KLEIN,
WILL C. KLEIN.